(12) United States Patent
Rakus

(10) Patent No.: US 10,840,034 B2
(45) Date of Patent: Nov. 17, 2020

(54) INTERLOCK SYSTEM FOR A CIRCUIT BREAKER SYSTEM

(71) Applicant: EATON INTELLIGENT POWER LIMITED, Dublin (IE)

(72) Inventor: Paul Richard Rakus, Moon Township, PA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 16/233,252

(22) Filed: Dec. 27, 2018

(65) Prior Publication Data
US 2020/0211793 A1  Jul. 2, 2020

(51) Int. Cl.
*H01H 9/22* (2006.01)
*H01H 71/02* (2006.01)
*H01H 71/12* (2006.01)

(52) U.S. Cl.
CPC .......... *H01H 9/22* (2013.01); *H01H 71/0264* (2013.01); *H01H 71/126* (2013.01)

(58) Field of Classification Search
CPC ..... H01H 9/22; H01H 71/0264; H01H 71/126
USPC ................ 200/50.21, 50.24–50.27
See application file for complete search history.

(56) References Cited

U.S. PATENT DOCUMENTS

| | | | |
|---|---|---|---|
| 3,235,681 A | 2/1966 | Pokorny et al. | |
| 8,953,305 B2* | 2/2015 | Rodgers | H01H 3/06 200/50.24 |
| 2009/0014291 A1 | 1/2009 | Stevenson | |
| 2011/0147173 A1 | 6/2011 | Lee et al. | |
| 2012/0055765 A1 | 3/2012 | Zylstra et al. | |
| 2012/0085628 A1* | 4/2012 | Pearce | H01H 9/22 200/50.24 |

OTHER PUBLICATIONS

European Patent Office, "International Search Report and Written Opinion" of corresponding PCT/EP2019/025488, dated Mar. 26, 2020, 16 pp.

* cited by examiner

*Primary Examiner* — Edwin A. Leon
*Assistant Examiner* — Lheiren Mae A Caroc
(74) *Attorney, Agent, or Firm* — Eckert Seamans Cherin & Mellott, LLC

(57) ABSTRACT

An interlock system including an actuatable motor control assembly, a movable access door and an interlock assembly. The actuatable motor control assembly is structured to energize and de-energize a racking assembly motor. The movable access door is structured to move between an open, first position wherein the access door does not block access to a manual racking assembly socket, and, a closed, second position wherein the access door blocks access to the manual racking assembly socket. The interlock assembly is structured to detect the configuration of the separable contact assembly and the position of the access door, and, to actuate the motor control assembly so as to energize the motor only when the separable contact assembly is in an open, first configuration and when the access door is in a closed, second position.

22 Claims, 6 Drawing Sheets

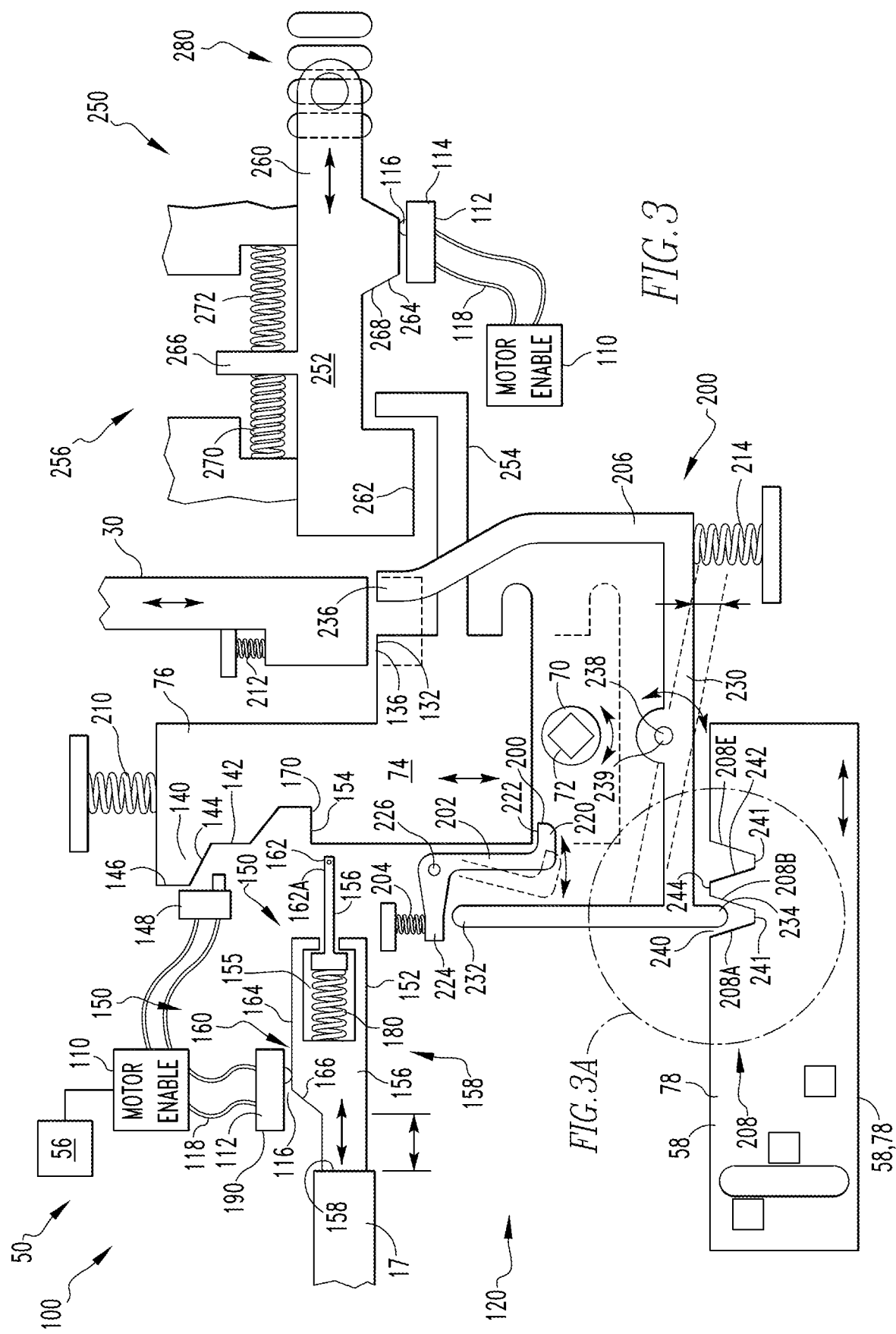

INTERLOCK SYSTEM FOR A CIRCUIT BREAKER SYSTEM

BACKGROUND OF THE INVENTION

Field of the Invention

The disclosed and claimed concept relates to an interlock assembly for a circuit breaker removably disposed in an enclosure and, more specifically, to an interlock assembly that only allows the removal or insertion of the circuit breaker from the enclosure, either manually or automatically, when the circuit breaker is in a specific configuration.

Background Information

Electrical switching apparatus include, for example, circuit switching devices, circuit interrupters, such as circuit breakers, network protectors, contactors, motor starters, motor controllers, and other load controllers. Electrical switching apparatus such as circuit interrupters and, in particular, circuit breakers, are well known in the art. Hereinafter, the discussion will use a circuit breaker as an example of an electrical switching apparatus; it is understood that, as used herein "circuit breaker" means an electrical switching apparatus.

Circuit breakers are used to protect electrical circuitry from damage due to an over-current condition, such as an overload condition or a relatively high level short circuit or fault condition. Circuit breakers, typically, include a number of pairs of separable contacts, an operating mechanism, and a trip assembly. The separable contacts move between on open, first configuration and a closed, second configuration. The separable contacts may be operated either manually by way of a control device disposed on the outside of the case or automatically in response to an over-current condition. That is, a circuit breaker includes an operating mechanism and a trip assembly. The operating mechanism is designed to rapidly open and close the separable contacts. The operating mechanism is structured to be latched and thereby maintain the contacts in a closed configuration. The trip assembly is structured to detect over-current conditions. When an over-current condition is detected, the trip assembly releases the operating mechanism latch thereby, allowing biasing elements to bias the operating mechanism and contacts, to an open configuration. Further, the trip assembly is structured to be actuated manually. As used herein, when the trip assembly is "actuated," the separable contacts are moved to the open, first configuration. When the trip assembly is maintained in the "actuated" configuration, the separable contacts are maintained in the open, first configuration. To assist in manually actuating the trip assembly, the circuit breaker/trip assembly includes a manually actuatable trip assembly member. That is, as used herein, a "manually actuatable trip assembly member" is a construct or assembly having an exposed element and which is operatively coupled to the trip assembly so that when the "manually actuatable trip assembly member" is actuated, the trip assembly is actuated.

A circuit breaker system includes the circuit breaker and an enclosure. That is, circuit breakers are, typically, disposed in a five-sided enclosure with a door for the sixth side. Line and, load conductors extend into the enclosure and are coupled to, and are in electrical communication with, a conductor assembly in the circuit breaker. As used herein, the side of the circuit breaker that faces the door, i.e., the side of the circuit breaker that is substantially exposed when the door is opened, is the "front." In an exemplary embodiment, the circuit breaker is disposed on a wheeled carriage that is part of a racking assembly. The racking assembly is structured to, and does, move the carriage, and therefore the circuit breaker, in and out of the enclosure. More specifically, the racking, assembly is structured to, and does, move the carriage/circuit breaker between a number of set positions including a disconnect, first position and a connect, second position, in another exemplary embodiment, the racking assembly is also structured to, and does, move the carriage/circuit breaker into an intermediate, test position.

In the disconnect, first position, the circuit breaker is disposed outside, or partially outside, of the enclosure and the circuit breaker is not electrically coupled to the line and load conductors. It is noted that the positions of the circuit breaker are relative to each other. Thus, in an exemplary embodiment, the circuit breaker in the first position is disposed substantially inside the enclosure, but more of the circuit breaker is disposed outside of the enclosure compared to the circuit breaker in the second position.

In the connect, second position, the circuit breaker is disposed inside, or substantially inside of the enclosure and the circuit breaker is electrically coupled to the line and load conductors. The connect, second position, is the position of the circuit breaker when in normal use/operation. As used herein, the positions identified in, these paragraphs are the "set" positions. That is, in one embodiment, the circuit breaker moves between the first and second set positions. In another, embodiment, the circuit breaker moves between a first, test, and second positions. Further, when the carriage/circuit breaker is/are moving between the set positions, the carriage/circuit breakers are, as used herein, in "transition."

In the intermediate, test position, the circuit breaker is disposed partially or minimally outside of the enclosure (i.e., more than in, the second position but less than in the first position) and the circuit breaker is electrically coupled to a test line conductor and a test load conductor. The test line/load conductors provide electrical energy to the circuit breaker so that the circuit breaker is able to be tested. Thus, users can perform tests on an energized circuit breaker. That is, the circuit breaker is energized by the test line/load conductors. It is understood the test line/load conductors, in an exemplary embodiment, carry a lower amount of electrical energy relative to the operational line/load conductors.

In another exemplary embodiment, the circuit breaker does not have a "test position," but is still structured to be tested. That is, in an alternate configuration, the circuit breaker moves between a first and second position as above, and the test conductors also move between a disconnected and a connected configuration. That is, when the circuit breaker is in the second position, the test conductors move between their disconnected and connected configurations. Thus, a configuration wherein the circuit breaker is in the second position and the test conductors are in the connected configuration is the equivalent of a "test position."

In a known embodiment, the racking assembly is a manual racking assembly. That is, the racking assembly includes a threaded rod having a socket at one end. The threaded rod is oriented so that the socket is disposed at the front of the circuit breaker. A user uses an actuator tool to actuate, i.e., rotate, the threaded rod. The racking assembly includes other mechanical elements that converted the rotating motion of the threaded rod into a forward/backward movement of the carriage and circuit breaker. The other elements of the racking assembly are not relevant to this disclosure.

As is known, electric energy can be dangerous. To minimize exposure to electric energy, the circuit breaker system includes one or more interlock assemblies. One interlock assembly is structured to ensure that the separable contacts are maintained in the open, first configuration when the circuit breaker is in transition. That is, it is safer to make/break connection, e.g., a connection with the test line/load conductors or the operation line/load conductors when the separable contacts are in the open, first configuration. The separable contacts, however, need the ability to be closed for testing and maintenance when in any of the set positions.

One known interlock assembly utilized a movable door disposed in front of the racking assembly threaded rod socket. The interlock assembly movable door moved between an upper, open position, wherein the socket was exposed and accessible to an actuator tool, and a closed, lower position, wherein the socket was not exposed and accessible to an actuator tool. The interlock assembly movable door was operatively coupled to the manually actuatable trip assembly member so that when the interlock assembly, movable door was in the first position, the manually actuatable trip assembly member was actuated. Thus, when the socket was exposed for the actuator tool, i.e., when the interlock assembly movable door was in the first position and when the circuit breaker could be moved, the manually actuatable trip assembly member was actuated and the separable contacts were maintained in the open, first, configuration.

The interlock assembly, however moved the interlock assembly movable door, or allowed the interlock assembly movable door to be moved, when the circuit breaker was in one of the set positions. In one embodiment, this was accomplished using a slotted element and a moving member sized to fit within the slots of the slotted element. As an example, the interlock assembly movable door was the slotted element. That is, the lower edge of the interlock assembly movable door included three spaced slots; each slot corresponding to a set position. The moving member moved with, or in a defined relationship with, the carriage assembly and along the bottom of the interlock assembly movable door. When the carriage was in a set position, the moving member aligned with the corresponding slot and the interlock assembly movable door fell to the second position. When the carriage was in transition, the moving member was not aligned with any slot and moved along the bottom of the interlock assembly movable door.

Accordingly, in this configuration, the user needed to open the interlock assembly movable door which maintained the separable contacts to the open, first position. That is, generally, the separable contacts were moved to the open, first position prior to an operation that moved the circuit breaker the interlock assembly further ensured that the separable contacts were maintained in the open, first position prior to moving the circuit breaker. Further, the interlock assembly moving member held the interlock assembly movable door in the open, upper position when the carriage/circuit breaker was in transition. Thus, the manually actuatable trip assembly member was actuated and the separable contacts were maintained in the open, first position when the carriage/circuit breaker was in transition. When the carriage/circuit breaker moved into a set position, the interlock assembly movable door would fall (assuming the actuator tool was removed from the threaded rod socket) and would no longer actuate the manually actuatable trip assembly member. Thus, the user could move the separable contacts to the closed, second position.

This configuration had the further advantage of allowing the user to know when the circuit breaker was in a set position. That is, the interlock assembly moving member could also be used as, or be operatively coupled to, an indicator. Further, the configuration of interlock assembly movable door indicated the position of the circuit breaker. That is, when the interlock assembly movable door was being held in the upper, open position, the circuit breaker was in transition.

This interlock assembly has the disadvantage of not being operable with an automatic, i.e., motor powered, racking assembly. That is, racking assemblies now include integral motors so that the racking assembly is operable remotely. As used herein, an "integral" motor is incorporated in one of the circuit breaker assembly, the enclosure or the interlock system. That is, for example, a motor for a motorized actuator that is moved between different circuit breaker is not an "integral" motor. Use of an integral motor, however, does not require the use of the socket on the threaded rod. Thus, if the integral motor was actuated with the interlock assembly movable door in the closed position, the carriage/circuit breaker could move, i.e., be in transition, with the separable contacts in the closed, second position. That is, when the interlock assembly movable door is in the closed position, the interlock assembly movable door does not actuate the manually actuatable trip assembly member and the contacts remain, or could be, closed. This is a problem. Further, even if a user was at the circuit breaker system to initially lift the interlock assembly movable door prior to engaging the integral motor, the interlock assembly could be damaged if the carriage moved between the first and second positions. That is, when traveling between the first and second positions, the carriage would move through the intermediate, test position. When, the carriage was in the intermediate, test position, the interlock assembly movable door would fall, as described above, but the integral motor would still be in operation. Thus, the interlock assembly moving member would move, or attempt to move, while disposed in the slot in the interlock assembly movable door. This would damage the interlock assembly moving member and/or the interlock assembly movable door. This is a problem.

There is, therefore, a need for an interlock system that can be used with the racking assembly that is actuatable both manually and automatically. Them is a further need for an interlock system that can be incorporated in existing circuit breaker systems.

SUMMARY OF THE INVENTION

These needs, and others, are met by at least one embodiment of the disclosed and claimed concept which provides an interlock system including an actuatable motor control, a movable access door and an interlock assembly. The actuatable motor control assembly is structured to energize and de-energize a racking assembly motor. The movable access door is structured to move between an open, first position wherein the access door does not block access to a manual racking assembly socket, and, a closed, second position wherein the access door blocks access to the manual racking assembly socket. The interlock assembly is structured to detect the configuration of the separable contact assembly and the position of the access door, and, to actuate the motor control assembly so as to energize the integral motor only when the separable contact assembly is, in an open, first configuration and when the access door is in a closed, second position.

An interlock system in this configuration solves the problems stated above.

BRIEF DESCRIPTION OF THE DRAWING

A full understanding of the invention can be gained from the following description of the preferred embodiments when read in conjunction with the accompanying drawings in which:

FIG. 3 is a detail schematic view of the second latch assembly.

DESCRIPTION OF THE PREFERRED EMBODIMENTS

Figure 1:
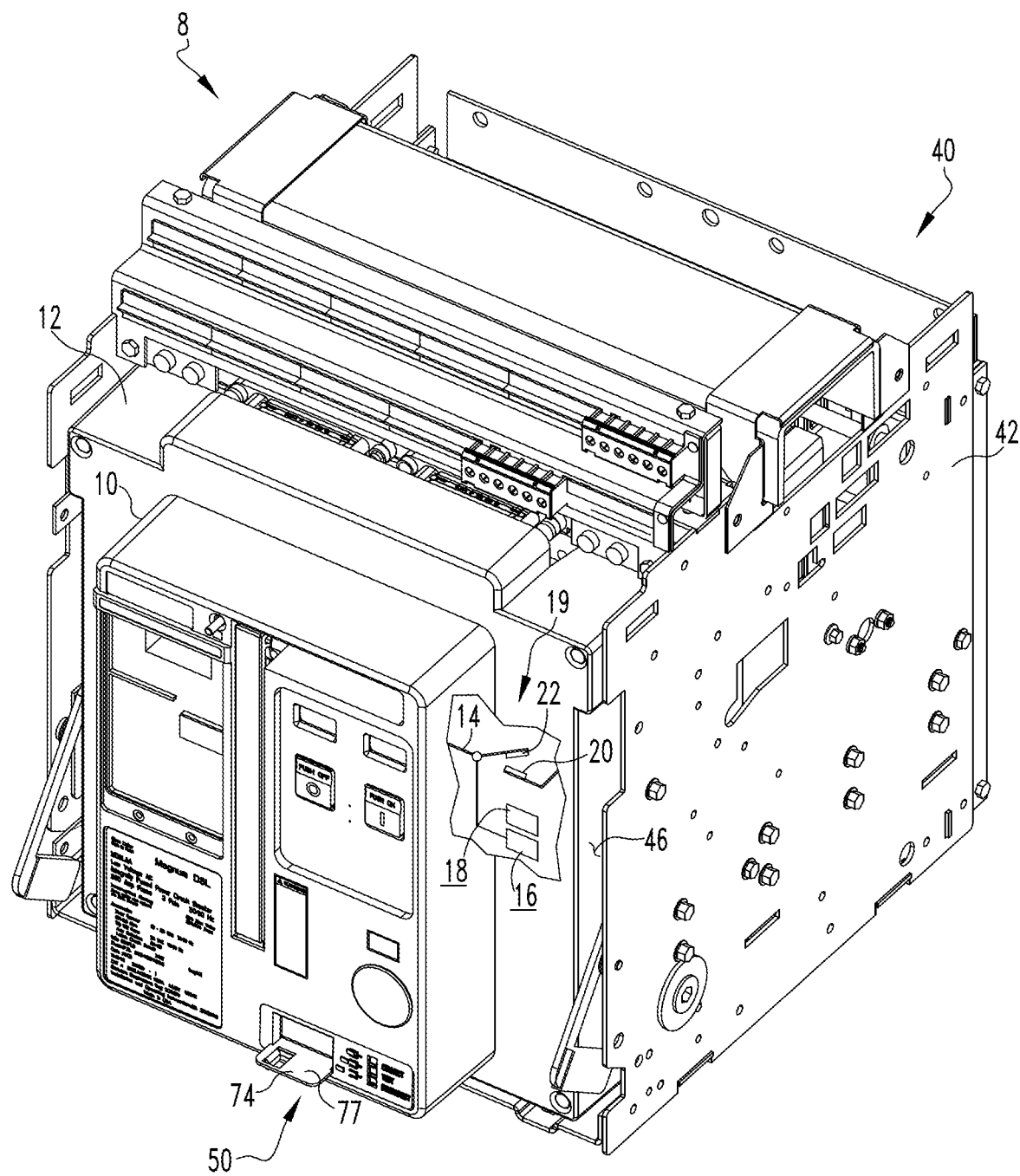
FIG. 1 is a schematic isometric view of a circuit breaker system with the circuit breaker in a first position.
Figure 1A:
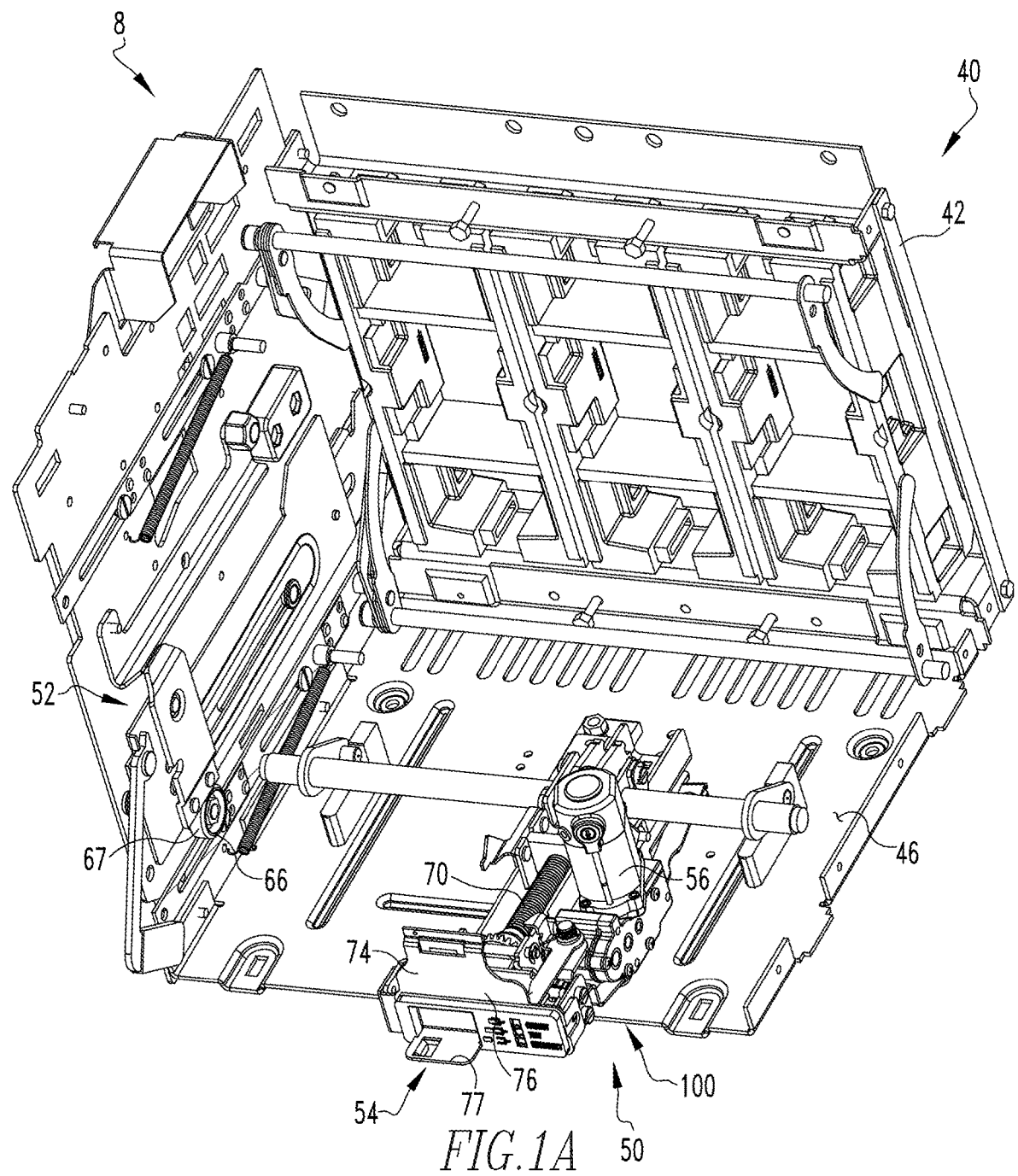
FIG. 1A is a schematic isometric view off circuit breaker system similar to FIG. 1 with the circuit breaker and a portion of the enclosure removed for clarity.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on, the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is, shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function or use. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in, the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means, that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first elements) or assembly(ies) is resting on a second element(s) or assembly(ies) in a manner that allows the first element/ assembly to be moved without having to decouple or otherwise manipulate the first element. For example, a book simply resting, on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening is made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

With the exception associated with a "latch," below, as used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element S while in element A first position. With regard to a latch assembly only, and as used herein, a phrase such as "the latch engages the catch" means that the latch exerts a force or bias against the catch, or, that the catch is in the path of the latch.

As used herein, a "latch assembly" means an assembly including at least a latch (or latch member) and a catch. It is understood that the latch and the catch are unitary with, coupled, directly coupled, or fixed to other elements. For example, a latch is typically coupled to a gate in a fence and a catch is typically coupled to fence post adjacent the gate. A latch moves between a first position, wherein the latch does not engage the catch or wherein the latch's path is not blocked by the catch so that the latch and the elements coupled thereto are free to move, and a second position, wherein the latch engages the catch or wherein the catch blocks the path of the latch so that the latch and the elements coupled thereto are not free to move. Alternatively, the catch is the movable element which moves relative to a latch. As above, and, as used herein, the latch "engages" the catch when the catch is biased against the latch or when the catch is in the path of the latch. Stated alternately, the configurations of the latch engaging the catch (or vice versa) or the catch blocking the path of the latch are equivalent and, as used herein with respect to latches only, a latch is "engaged" with catch when the latch and the catch cannot be separated without an additional action such as, but not limited to, an action by a user.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied, to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a Plurality). That is, for example, the phrase "a number of elements" means, one element or a plurality of elements.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "about" in a phrase such as "disposed about [an element, point or axis]" or "extend about [an element, point or axis]" or "[X] degrees about an [element, point or axis]," means encircle, extend around, or measured around. When used in reference to a measurement or in a similar manner, "about" means "approximately," i.e., in an approximate maize relevant to the measurement as would be understood by one of ordinary skill in the art.

As used herein, "generally curvilinear" includes elements having multiple curved portions, combinations of curved portions and planar portions, and a plurality of planar portions or segments disposed at angles relative to each other thereby forming a curve.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at") means on and/or near relevant to the term being modified as would be understood by one of ordinary skill in the art.

As used herein, a "use device" means a construct/assembly that is configurable in different configurations wherein at least one configuration is, or is potentially, dangerous. For example, a circuit breaker is a "use device" because, while substantially safe, electric current flowing through a circuit breaker when the separable contacts are in a closed, second position, makes a circuit breaker potentially dangerous.

As used herein, a "control device" means a construct/assembly that is part of, or that is associated with, a "use device" and which is operatively coupled to an interlock.

As used herein, an "interlock" (or "interlock assembly") means a construct/assembly that is operatively coupled to a "use device," including the internal elements/assemblies thereof, and which is structured to place the "use device," including the internal elements/assemblies thereof; in a specific configuration when a control device, or control devices, is/are in a specific position or configuration. For example, a circuit breaker is disposed within an enclosure having an access door. A mechanical linkage operatively couples the enclosure access door to the circuit breaker's trip bar. When the enclosure access door is opened, the mechanical linkage moves the circuit breaker's trip bar to, and maintains the circuit breaker's trip bar in, the tripped, open position. It is understood that when a circuit breaker's trip bar is in the tripped position, the circuit breaker contacts are maintained in the open configuration. Thus, moving the trip bar to, and maintaining the trip bar in, the tripped position moves the circuit breaker contacts in the open configuration and keeps the circuit breaker contacts in the open configuration. In this configuration, the access door is the "control device," the mechanical linkage is an "interlock," and the circuit breaker is the "use device." That is, the access door is associated with the circuit breaker and operatively coupled to the mechanical linkage. The mechanical linkage, when actuated, reconfigures and maintains the circuit breaker, including the internal elements/assemblies thereof, in a specific configuration so long as the access door is open. Thus, the "interlock." maintains the "use device" in a specific configuration.

Further, as used herein, an "interlock" must maintain the use device in the specific configuration until the user returns the "control device" to the original configuration or other desired configuration. That is, in the example above, the circuit breaker is maintained in the nipped/open configuration so long as the enclosure access door is open. When the enclosure access door is returned to the original closed configuration, the "interlock" no longer maintains the use device in the specific configuration. That is, returning the "control device" to the original configuration does not necessarily reconfigure the "use device." Thus, in this example, closing the enclosure access door does not close the separable contacts of the circuit breaker.

Conversely, as used herein, a "safety assembly," such as but not limited to an automatic trip assembly is a construct that reconfigures a "use device" upon actuation of a "control device" but which does not maintain the "use device" in a specific configuration. For example, in the example above, if the mechanical linkage only moved the trip bar to the tripped position, but did not maintain it there, the user could reposition the trip bar to a non-tripped position and then close the circuit breaker contacts. Such an assembly would not be an "interlock" as it does not maintain the "use device" in a specific configuration.

It is understood that the specific configuration of elements disclosed below is exemplary and that the claims are not limited to the specific configurations disclosed. That is, for example, a description of element "A" rotatably coupled to element "B" may state that element A includes an axle, element B includes a circular opening, and that elements A/B are coupled by inserting the axle into the opening. It is understood that an alternate configuration wherein element A includes a circular opening and element B includes an axle is an equivalent configuration of the exemplary configuration disclosed in this paragraph.

Various motions of a circuit breaker assembly 10 and an interlock system 100 or their elements are discussed below. These motions include, but are not limited to pivoting, sliding, translating, rotating and combinations thereof. These motions generally maintain the element being moved in a plane. As is known, such motions are, or can be, made interchangeable. That is, for example, the change in the configuration of the elements caused by an element being translated between two positions may also be made by the element sliding between the two positions. Thus, as used herein, any motion that occurs generally in a plane is the equivalent of any other motion that occurs generally in a plane. Thus, for example, sliding is the equivalent of pivoting.

FIG. 1 shows a circuit breaker system 8 including a circuit breaker assembly 10, an enclosure 40 and an interlock system 100. The circuit breaker assembly 10 includes a housing assembly 12, a conductor assembly 14, an operating mechanism 16, and a trip assembly 18, shown schematically. The conductor assembly 14 includes a number of conductive members which are selectively in electrical communication with a line conductor and a load conductor (neither shown), as discussed below. The conductor assembly 14 includes a separable contact assembly 19. The separable contact assembly 19 includes a number of fixed contacts 20 and a number of movable contacts 22. The operating mechanism 16 is operatively coupled to the separable contact assembly 19 and is structured to move each movable contact 22 between an open, first configuration, wherein the movable contact assembly 22 is spaced from the associated fixed contact 20, and a closed, second configuration, wherein the movable contact 22 is coupled to, and in electrical communication with, the fixed contact 20.

The operating mechanism 16 also includes a contact position indicator member 17. The contact position indicator member 17 (FIG. 3) moves between an open, first position and a closed, second position corresponding to the configuration of the separable contact assembly 19. That is, when the separable contact assembly 19 is in the first configuration, the contact position indicator member 17 is in the contact position indicator member 17 first position, and, when the separable contact assembly 19 is in the second configuration, the contact position indicator member 17 is in the contact position indicator member 17 second position.

Figure 3A:
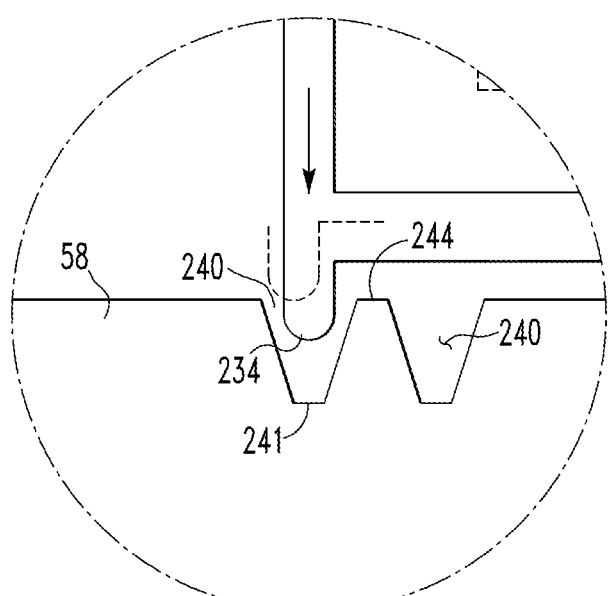
FIG. 3A is a detail schematic view of the pivoting member in the first position.
Figure 3B:
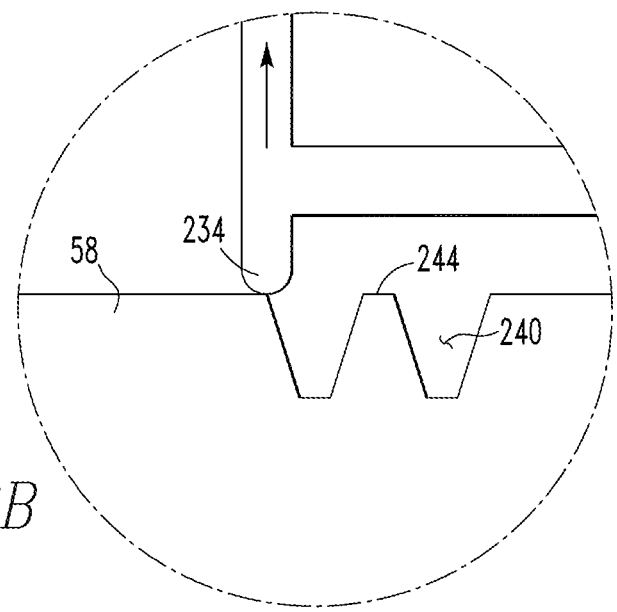
FIG. 3B is a detail schematic view of the pivoting member in the second position.

As is known, the trip assembly 18 is structured to detect an overcurrent condition and to cause the separable contact assembly 19 to move from the second configuration to the first configuration. That is, the trip assembly 18 is operatively coupled to the operating mechanism 16 and, when an over current condition is detected, the trip assembly 18 causes the operating mechanism 16 to move the separable contact assembly 19 from the second configuration to the first configuration. Further, as used herein, the trip assembly 18 is structured to be "actuated." When the trip assembly 18 is "actuated," the trip assembly 18 moves the separable contact assembly 19 from the second configuration to the first configuration and/or maintains the separable contact assembly 19 in the first configuration. The operating mechanism 16 and/or the trip assembly 18 includes a manually actuatable trip assembly member 30 (FIG. 3). The trip assembly member 30 moves between two positions; a first position, wherein the trip assembly member 30 actuates the trip assembly 18 and a second position, wherein the trip assembly member 30 does not actuate the trip assembly 18. Accordingly, as used herein, the trip assembly member 30 is either "actuated," meaning that the trip assembly 18 is also "actuated" as defined above, or, the trip assembly member 30 is not "actuated," meaning that the trip assembly 18 is not "actuated" as defined above. Stated alternately, the position of the trip assembly member 30 corresponds to the configuration of the trip assembly 18 and, therefore, the configuration of the separable contact assembly 19. It is understood that, the trip assembly member 30 is, in an exemplary embodiment, part of a linkage (not numbered) extending from the operating mechanism 16. This linkage is structured to remain operatively coupled to the interlock assembly 120, described below, as the circuit breaker assembly 10/racking assembly carriage 52 moves, as described below.

In an exemplary embodiment, the enclosure 40 includes a housing assembly 42 with five generally planar sidewalls (not numbered) and a movable door (not shown). In an exemplary embodiment, the enclosure housing assembly 42 sidewalls and door are disposed in a generally parallelepiped configuration. That is, the housing assembly 42 sidewalls define a generally enclosed space 46 (hereinafter, "enclosure enclosed space" 46). As is known, a line conductor and a load conductor (not shown) extend from outside the enclosure enclosed space 46 to inside the enclosure enclosed space 46. In an exemplary embodiment, the line conductor and the load conductor extend through the enclosure housing assembly rear sidewall, i.e., the sidewall opposite the door. The door is movable between an open, first position, wherein the door is pivoted away from the enclosure enclosed space 46 and a closed, second position wherein the door is generally parallel with the sidewall opposite the door.

The enclosure 40, and/or the circuit breaker system 8, also includes a racking assembly 50. The racking assembly 50 is structured to, and does, move the circuit breaker assembly 10 between the three set positions defined above. The racking assembly 50 is structured to, and does, operate either manually or automatically. As used herein, "manual" operation of the racking assembly 50 means that the power used to operate the racking assembly 50 is generated by a user, i.e., by physical exertion. As used herein, "automatic" operation of the racking assembly 50 means that the power used to operate the racking assembly 50 is generated by an integral motor or similar construct.

In an exemplary embodiment, the racking, assembly includes a carriage 52, a manual racking assembly 54, an integral motor 56, and a position indicator 58. The racking assembly carriage 52 includes a body 60 and a motion assembly 66. The motion assembly 66 is structured to, and does, allow the carriage body 60 to move relative to the enclosure 40. In an exemplary embodiment, the motion assembly 66 includes wheels that travel over a platform or rails (none shown/numbered). In another embodiment, the motion assembly 66 includes wheels fixed to the enclosure 40 and rails fixed to the circuit breaker assembly 10 that travel over the wheels 67. That is, in this embodiment as shown, the rails are the racking assembly carriage 52 and the wheels 67 are the motion assembly 66.

The racking assembly carriage 52, and therefore the circuit breaker assembly 10, is, in one embodiment, structured to move between a number of "set" positions including a disconnect, first position a connect, second position. In another embodiment, the racking assembly carriage 52, and therefore the circuit breaker assembly 10, are also structured to move into an intermediate, test position between the first and second positions. These set positions correspond to the circuit breaker assembly 10 "set" positions defined above. If the racking assembly carriage 52 is not in an identified set position, the racking assembly carriage 52 is, as used herein, in "transition." It is understood that the disclosed configuration is exemplary and that similar equivalent positions and/or configuration of the disclosed elements can be achieved in different manners. For example, rather than moving the racking assembly carriage 52/circuit breaker assembly 10 from a test position to a first position, the elements disclosed herein can be configured to move selected conductors toward/away from the circuit breaker assembly 10 thereby creating a substantially similar configuration which is equivalent to the positions described herein. As such, it is understood that the "positions" disclosed herein are representative of configurations wherein the elements discussed herein are in the identified configurations. That is, as used herein, the "set positions" are equivalent to "set configurations" wherein different selected elements are moved so as to create a desired configuration wherein the elements are, effectively, in the "set positions."

The manual racking assembly 54 is structured to move the racking assembly carriage 52 between the racking assembly carriage 52 set positions. The manual racking assembly 54 includes a rotating rod 70 with a socket 72 (FIG. 3), and, an access door 74. A description of the configuration and mechanical operation of the manual racking assembly 54 is not needed for this disclosure, but generally, a tool (not shown) is inserted into the manual racking assembly rod socket 72. A user rotates the tool, and therefore the manual racking assembly rod 70. This motion is mechanically convened into a motion that moves the racking assembly carriage 52 between the racking assembly carriage 52 set positions. As, is known, the circuit breaker assembly 10 is disposed on the racking assembly carriage 52 and also moves between the "set" positions or is in "transition," as defined above.

The access door 74, in an exemplary embodiment, is movably coupled to the circuit breaker assembly housing assembly 12 and is structured to, and does, slide between an open, first position, wherein the access door 74 does not cover, i.e., does not block access to, the manual racking assembly rod socket 72, and, a closed, second position, wherein the access door 74 covers, or blocks access to, the manual racking assembly rod socket 72. In an exemplary embodiment, the access door 74 includes a handle (not shown) and the positioning of the access door 74 is controlled by a user. That is, in an exemplary embodiment, a user moves the access door 74 to a selected position. The access door 74 is maintained in the selected position by either the first latch assembly 200 and/or the second latch assembly 150, discussed below. That is, a user must lift the access door 74 to access the manual racking assembly rod socket 72. In an exemplary embodiment, the access door 74 "translates" between the first and second position, slides vertically while maintaining its orientation relative to the circuit breaker assembly housing assembly 12.

The racking assembly motor 56 (hereinafter "motor" 56) is also operatively coupled to the racking assembly carriage 52 and is structured to move the racking assembly earring 52 between the racking assembly carriage 52 set positions. In an exemplary embodiment, the motor 56 is operatively coupled to the manual racking assembly rod 70 and is structured to rotate the manual racking assembly rod 70. In an exemplary embodiment, the motor 56 is actuated by an electric signal. That is, an electric signal causes the motor 56 to turn on/off and controls the direction of the motor output, and, therefore, the direction the motor 56 moves the racking assembly carriage 52.

The racking assembly "position indicator" 58 is, as used herein and in an exemplary embodiment, a mechanical construct that is structured to move with the racking assembly carriage 52. In the Figures, the racking assembly position indicator 58 is shown as a single construct or member. It is understood that the racking assembly position indicator 58, in another embodiment (not shown), includes multiple constructs or bodies. For example, in another embodiment (not shown), one body includes indicia (not numbered) while another body defines the first latch assembly camming surfaces 208, discussed below. The racking assembly position indicator 58 is, in an exemplary embodiment, coupled to a linkage (not shown) that converts a forward/backward motion, i.e., the motion of the racking assembly carriage 52 in/out of the enclosure 40, to a lateral, or right/left, motion. In an exemplary embodiment, the racking assembly position indicator 58 includes an indicia, and another construct, such as but not limited to the enclosure 40, and includes a number of windows (none shown) corresponding to the set positions of the racking assembly carriage 52. Thus, as the racking assembly carriage 52, and therefore the racking assembly position indicator 58, moves, the indicia moves between the windows. That is, for example, when the racking assembly carriage 52 is in the "test position," the indicia on the racking assembly position indicator 58 appears, in a window identified as "test position." If the indicia is not in, or not fully in, a window, the racking assembly position indicator 58 reveals that the racking assembly carriage 52 is in "transition." Thus, the racking assembly position indicator 58 is structured to, and does, indicate the position of the racking assembly carriage 52 and the circuit breaker assembly 10 that moves therewith. In an exemplary embodiment, the racking assembly position indicator 58 includes an elongated, generally planar indicator member body 78. Further, in an exemplary embodiment, the indicator member body 78 is disposed in a generally vertical plane. That is, the plane of the generally planar indicator member body 78 extends generally vertically.

As shown in FIG. 3, the interlock system 100 is structured to position and maintain elements of the circuit breaker assembly 10 in a desired configuration when the circuit breaker assembly 1 is in a selected set position or when the circuit breaker assembly 10 is in transition. In an exemplary embodiment, the interlock assembly 100 is structured to detect the configuration of the separable contact assembly 19 and the position of the access door 74. As used herein, to "to detect the configuration and the position" means that elements of the interlock assembly 100 are structured to selectively interact with other elements of the circuit breaker assembly 10 and that the elements of the interlock assembly 100 only interact with the elements of the circuit breaker assembly 10 are in selected configurations/positions. Thus, due to the interaction, or the lack of an interaction, the interlock assembly 100 detects the configurations/positions of the circuit breaker assembly 10. Further, in an exemplary embodiment, the interlock assembly 100 is structured to activate a motor control assembly 110 so, as to enable the motor 56 only when the separable contact assembly 19 is in the first configuration and when the access door 74 is in the closed, second position. The interlock system 100 includes elements that have also been identified as parts of other assemblies/constructs set forth above. For example, the access door 74 is also part of the interlock system 100. In an exemplary embodiment, the interlock system 100 includes the access door 74, the actuatable motor control assembly 110 and an interlock assembly 120.

The actuatable motor control assembly 110 is structured to enable/disable the motor 56. That is, the motor control assembly 110 includes electronics, the specific nature of which are not relevant to this disclosure, that are configured to either allow the racking assembly, motor 56 to be actuated or prevent the racking assembly motor 56 from being actuated. That is, as used herein, to "enable/disable" means to allow/prevent another construct from being actuated; "enable/disable" does not mean to actuate, or not actuate, another construct. Further, as used herein, the motor control assembly 110 is identified as "activated" when the motor 56 is enabled. Conversely, the motor control assembly 110 is identified as "deactivated" when the racking assembly motor 56 is disabled. Thus, the motor control assembly 110 is structured to be, and is, either "activated" or "deactivated." Further, when the motor control assembly motor 56 is enabled a user can provide another signal that energizes the motor 56 causing the racking assembly carriage 52 to move.

In an exemplary embodiment, the motor control assembly 110 is activated/deactivated by a number of sensors 112. The exemplary sensors 112 are generally similar and one is described herein; below, the sensors will be identified by separate names and reference numbers indicating the location of a sensor while the common elements of the sensors 112 will share reference numbers. It is understood that the mechanical sensors discussed herein are exemplary and that other types of sensors are operable with the motor control assembly 110. A sensor 112 includes a housing 114 with an external actuation switch 116. In an exemplary embodiment, the actuation switch 116 moves between an unactuated, extended first position, wherein the actuation switch 116 extends generally fully from the sensor housing 114, and, an actuated, depressed position, wherein the actuation switch 116 is disposed partially in the sensor housing 114. When the actuation switch 116 is in the first position, the sensor 112 does not send an activation signal to the motor control assembly 110 and the motor control assembly 110 is deactivated. Conversely, when the actuation switch 116 is in the second position, the sensor 112 sends an activation signal to the motor control assembly 110 and the motor control assembly 110 is activated. As, used herein, when an actuation switch 116 is "actuated," the actuation switch 116 is in the second position. Otherwise, the actuation switch 116 is in the second position. The sensor 112 is structured to, and does, communicate the activation signal to the motor control assembly 110 whether by wire 118 or a similar construct, or, wirelessly (not shown), i.e., via radio, Bluetooth, or similar frequencies.

In an exemplary embodiment, the access door 74 is a "control device" that is also identified as part of the interlock assembly 120 and/or is an element which operatively engages the interlock assembly 120. The access door 74 includes a trip assembly member interface 130, a motor control assembly actuator interface 140, and a second latch assembly catch 154. In an exemplary embodiment, and as shown, the access door 74 includes a generally planar body 76. As shown, the access door generally planar body 76 includes generally perpendicular tab 77 having an opening (not numbered). As is known, the access door tab 77 is structured to have a lock or similar restraint passed therethrough. In an exemplary embodiment, the trip assembly member interface 130 is a portion of the perimeter of the access door body 76. That is, the perimeter of the access door body 76 includes a generally horizontal portion 132, i.e., a ledge, which is the trip assembly member interface 130. In this embodiment the trip assembly member 30 extends adjacent to the trip assembly member interlace 130 and is structured to, and does, move between an upper, first position wherein the trip assembly member 30 actuates the trip assembly 18 and a lower, second position, wherein the trip assembly member 30 does not actuate the trip assembly 18. The trip assembly member 30 is disposed above, and in the path of, the trip assembly member interface 130. In this configuration, when the access door 74 is in the second position, the trip assembly member interface 130 does not engage the trip assembly member 30 and the trip assembly member 30 remains in the second position. When the access door 74 is moved to the first position, the trip assembly member interface 130 engages, or "actuates," the trip assembly member 30 and moves the trip assembly member 30 to the first position. Further, so long as the access door 74 remains in the first position, the trip assembly member interface 130 actuates the trip assembly member 30 and maintains the trip assembly member 30 in the first position. Thus, whenever the access door 74 is in the open, first position, the trip assembly member 30 is in the first position and the separable contact assembly 19 is in the open, first configuration.

The motor control assembly actuator interface 140 is structured to, and does, activate the motor control assembly 110 when the access door 74 is in the second position, and is not structured to activate said motor control assembly 110 when the access door 74 is in the first position. The motor control assembly actuator interface 140 is also disposed along the perimeter of the access door 74. That is, in an exemplary embodiment, the perimeter of the access door body 76 includes a vertical surface having an inwardly offset portion 142, an angled transition surface 144, and outwardly offset portion 146. The terms "inwardly offset" and "outward offset" refer to the offset between the two portions; that is, these are relative terms. The motor control assembly actuator interface 140 interacts with a sensor 112, as described above.

That is, the interlock assembly 120 includes an access door position sensor 148 (which is a sensor 112 as described above) with an actuation switch 116. It is understood that the elements of a sensor 112 will be identified with the reference numbers set forth above, but that the sensor will be identified by a name such as "access door position" sensor 148. Thus, the access door position sensor 148 has an actuation switch 116 which is also identified herein as the "access door position sensor actuation switch 116." The access door position sensor actuation switch 116 is disposed in the path of the motor control assembly actuator interlace 140. That is, as shown, when the access door 74 is in the first position, the inwardly offset portion 142 is disposed adjacent to, but is spaced from, the access door position sensor actuation switch 116. Thus, the access door position sensor actuation switch 116 is not actuated when the access door 74 is in the first position and the access door position sensor 148 does not send an activation signal to the motor control assembly 110 and the motor control assembly 110 is deactivated. As the access door 74 moves toward the second position, the angled transition surface 144 engages the access door position sensor actuation switch 116 and moves the access door position sensor actuation switch 116 to the second position. When the access door 74 is in the second position, the access door position sensor actuation switch 116 is actuated, i.e., is in the second position and the access door position sensor 148 sends an activation signal to the motor control assembly 110 and the motor control assembly 110 is activated. In this configuration, the motor 56 is enabled and the motor 56 is usable. It is understood that a sensor 112 is "positioned" by coupling the sensor 112 to a housing assembly or any other construct located at the position the sensor 112 is located.

The interlock assembly 120 includes a second latch assembly 150 (a first latch assembly 200 is discussed below). The second latch assembly 150 includes a latch member 152 and the second latch assembly catch 154. The second latch assembly latch member 152 includes an elongated body 156 with a contact position indicator member interface 158, a motor control assembly actuator interface 160 and a latch 162. In an exemplary embodiment, the second latch assembly latch member body contact position indicator member interface 158 (hereinafter the "contact position indicator member interface" 158) is structured to be, and is, coupled, directly coupled, fixed to the contact position indicator member 17, or, is structured to be, and is, engaged by the contact position indicator member 17. Thus, the second latch assembly latch member 152 moves with the contact position indicator member 17. That is, the second latch assembly latch member 152 moves between a first position and a second position corresponding to the position of the contact position indicator member 17. Stated alternately, in an exemplary embodiment, the contact position indicator member 17 is operatively coupled to the contact position indicator member interface 158. That is, the contact, position indicator member 17 is coupled to the contact position indicator member interface 158 so that when the contact position indicator member 17 is in the contact position indicator member 17 second position, the second latch assembly latch member body 156 is in the second latch assembly latch member body 156 second position. When the contact position indicator member 17 is in the contact position indicator member 17 first position, the second latch assembly latch member body 156 is in the second latch assembly latch member body 156 first position.

The second latch assembly latch member body motor control assembly actuator interface 160 (hereinafter, the "motor control assembly actuator interface" 160) is, in an exemplary embodiment, an outwardly offset portion of the second latch assembly latch member body 156 that includes a generally planar surface 164 and an angled transition surfaces 166. The motor control assembly actuator interface 160 is structured to, and does, selectively engage an actuation switch 116 on a second, latch assembly latch member position sensor 190, as described below. The second latch assembly latch member body latch 162 is structured to be, and is, engaged by the second latch assembly catch 154. In an exemplary embodiment, the second latch assembly latch member body latch 162 is the end of the second latch assembly latch member body 156 opposite the contact position indicator member interface 158.

The second latch assembly catch 154 is, in an exemplary embodiment, a generally horizontal recess 170 in the access door 74. That is, the access door 74 includes a generally vertical side and the second latch assembly catch 154 is a generally horizontal recess 170 in the vertical side of the access door 74. The second latch assembly latch member body latch 162 is structured to be, and is, engaged by the second latch assembly catch 154 only when the access door 74 is in the second position. It is understood that when the access door 74 is not in the second position, the second latch assembly latch member body latch 162 is disposed adjacent to, or engages, the access door 74 generally vertical side.

That is, the second latch assembly 150 is configured as follows. The second latch assembly latch member body 156 is structured to move between a first position, wherein the second latch assembly latch member body latch 162 does not engage the second latch assembly catch 154, and a second position, wherein the second latch assembly latch member body latch 162 engages the second latch assembly catch 154. In an exemplary embodiment, the second latch assembly latch member body 156 is movably, or in an exemplary embodiment, slidably, coupled to a construct such as, but not limited to, the circuit breaker assembly housing assembly 12 adjacent the access door 74. When the second latch assembly latch member body 156 is in the first position, the second latch assembly latch member body latch 162 is spaced from the second latch assembly catch 154. Thus, the access door 74 is able to move between its first and second positions. When the second latch assembly latch member body 156 is in the second position, the second latch assembly latch member body latch 162 is disposed in the second latch assembly catch 154, i.e., in the second latch assembly catch recess 170 and the access door 74 is maintained in the second position.

Further, in an exemplary embodiment, the second latch assembly 150 includes a spring 180 and a movable second latch assembly latch member body latch 162A. In this embodiment, the second latch assembly latch member body 156 defines a cavity 155 and the movable second latch assembly latch member body latch 162A is a separate element, in this embodiment, the second latch assembly spring 180 is disposed in the cavity 155. Further, the second latch assembly latch member body latch 162 is partially disposed in the cavity 155 with the second latch assembly spring 180 biasing the second latch assembly latch member body latch 162 outwardly, i.e., toward the access door 74.

Figure 4:
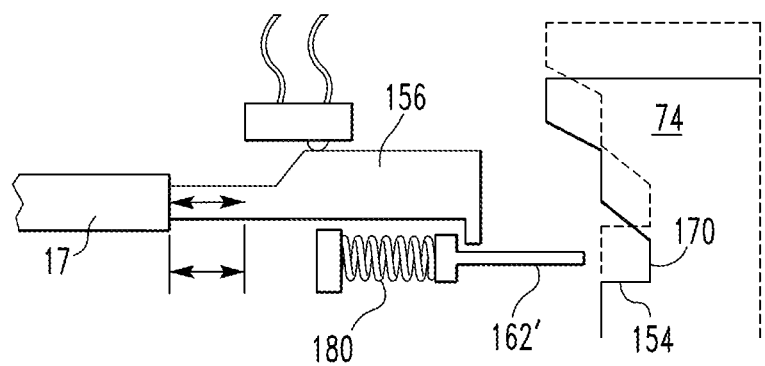
FIG. 4 is a schematic side view of an alternate second latch assembly latch member body.

In another alternate embodiment, shown in FIG. 4, the second latch assembly latch member body 156 does not include a cavity, but does include a perpendicular tab 75 disposed at the distal end of the second latch assembly latch member body 156. In this embodiment, the movable second latch assembly latch member body latch 162A is disposed on a track (not shown) or similar construct that allows the movable second latch assembly latch member body latch 162A to slide generally perpendicularly to the access door 74 path of motion. Further, the second latch assembly latch member body latch 162A' is engaged by both the second latch assembly spring 180 and the second latch assembly latch member body tab 75. As with the embodiment above, the second latch assembly spring 180 biases the second latch assembly latch member body latch 162 toward the access door 74. That is, toward the second position. The second latch assembly latch member body tab 75 moves with the second latch assembly latch member body 156 and is positioned to engage the second latch assembly latch member body latch 162A'. Thus when the second latch assembly latch member body 156 is moved to the first position, the second latch assembly latch member body tab 75 engages the second latch assembly latch member body latch 162A' and moves it to a second position wherein the second latch assembly latch member body latch 162A' is spaced from the access door 74. This motion also compresses the second latch assembly spring 180.

Further, the interlock assembly 120 includes a second latch, assembly latch member position sensor 190. As before, the second latch assembly latch member position sensor 190 includes an actuation switch 116 identified herein as the "second latch assembly latch member position sensor actuation switch" 116. The second latch assembly latch member position sensor 190 is structured to, and does, provide an activation signal to the motor control assembly 110 when the second latch assembly latch member position sensor actuation switch 116 is actuated and does not provide an activation signal to the motor control assembly 110 when the second latch assembly latch member position sensor actuation switch 116 is not actuated. That is, the second latch assembly latch member position sensor 190 is positioned adjacent the path of travel of the motor control assembly actuator interface 160 so that when the second latch assembly latch member 152 is in the first position, the motor control assembly actuator interface 160 actuates the second latch assembly latch member position sensor actuation switch 116, and, when the second latch assembly latch member 152 is in the second position, the motor control assembly actuator interface 160 does not actuate the second latch assembly latch member position sensor actuation switch 116.

In this configuration, the access door 74 is maintained in the closed, second position when the separable contact assembly 19 is in the closed configuration. That is, as noted above, when the access door 74 is in the first position, the interaction between the access door 74 and the trip assembly member interface 130 maintains the separable contact assembly 19 in the open, first configuration. When the access door 74 is moved to the closed, second position, the second latch assembly spring 180 moves the second latch assembly latch member body 156 to the second latch assembly latch member body 156 first position. That is, the second latch assembly latch member body latch 162 is disposed in the second latch assembly catch 154, i.e., in the second latch assembly catch recess 170. In this configuration, a user is able to utilize the operating mechanism 16 to move the separable contact assembly 19 from the open, first configuration to the closed, second configuration. Moving the separable contact assembly 19 from the open, first configuration to the closed, second configuration also moves the contact position indicator member 17 to the contact position indicator member 17 second position. When the contact position indicator member 17 is in the contact position indicator member 17 second position, the second latch assembly latch member body latch 162 is maintained in the second latch assembly catch 154. Thus, the access door 74 is maintained in the closed, second position when the separable contact assembly 19 is in the closed configuration.

The interlock assembly 120 also includes a first latch assembly 200 that is structured to, and does, maintain the access door 74 in the first position when the racking assembly carriage 52 is in transition and, is structured to, and does, release the access door 74 to be moved to the second position when the racking assembly carriage 52 is in a set position. As used herein, "release," when used in reference to a latch assembly, means that the latch and catch elements of the latch assembly are no longer engaged with each other, or are no longer disposed in the path of each other, and that the latched element is free to move. That is, to "release" does not move the latched member but rather configures the elements of the latch assembly so that the latched member is free to be moved. In an exemplary embodiment, the first latch assembly 200 includes an access door latch member 202, an access door latch member spring 204, a pivoting member 206, a number of camming surfaces 208, a first closing spring 210, a second closing spring 212 and a pivoting member spring 214. The first latch assembly access door latch member 202 (hereinafter, the "access door latch member" 202) is structured to, and does, move between a first position, wherein the access door latch, member 202 engages the access door 74 and maintains the access door 74 in the access door first position, and, a second position, wherein said access door latch member 202 releases the access door 74 thereby allowing the access door 74 to move to access door 74 second position. With regard to elements that engage other elements, and as used herein, a "minimal engagement" means that the bias created by the engagement is reduced to a minimal/negligible bias, or, that no bias exists, e.g., the elements are no longer coupled and no bias is applied.

That is, in an exemplary embodiment, the access door latch member 202 includes a body 220 with an access door interface 222 and a pivoting member interface 224. The access door latch member body 220 is movably, and as shown rotatably/pivotally, mounted adjacent the access door 74. Thus, the access door latch member body 220 includes a pivot mounting 226 such as, but not limited to, an opening. The access door latch member body access door interface 222 is structured to, and does, engage the lower side of the access door 74. The access door latch member body pivoting member interface 224 is disposed on the other side of the access door latch member body pivot mounting 226 relative to the access door latch member body access door interface 222. Thus, as shown, as the access door latch member body access door interface 222 moves up, the access door latch member body pivoting member interface 224 moves down, and vice versa.

The access door latch member spring 204 is disposed/positioned adjacent the access door latch member 202 and engages the access door latch member 202 thereby biasing the access door latch member 202 toward the access door latch member 202 first position. In an exemplary embodiment, the access door latch member spring 204 is substantially weaker than the other springs discussed herein. That is, the access door latch member spring 204 does not apply bias, directly or indirectly, sufficient to effect any element in the interlock system 100 other than the access door latch member 202. That is, the access door latch member spring 204 is only structured to, and does, move the access door latch member 202 from the second position to the first position. Otherwise, the position of the access door latch member 202 is controlled by the position of the pivoting member 206, as discussed below.

The pivoting member 206 includes an elongated body 230 which, as shown, in an exemplary embodiment, is generally U-shaped. That is, generally, the pivoting member body 230 includes two upwardly extending "tines" and a generally horizontal "bight" (none numbered). The pivoting member body 230 includes an access door latch member interface 232, a cam 234, and a trip assembly member interface 236 as well as a pivot mounting 238, as shown an opening, disposed between the earn 234 and the trip assembly member interface 236. Further, in an exemplary embodiment, the pivoting member body pivot mounting 238 includes an axle 239. It is understood that the pivoting member body pivot mounting axle 239 is, actually coupled to the enclosure housing assembly 42 but as used herein, the pivoting member body pivot mounting axle 239 is identified as part of the pivoting member 206. The pivoting member body 230 is structured to, and does, pivot between an access door open, first position, wherein the pivoting member body trip assembly member interface 236 actuates the trip assembly member 30, and an access door 74 closed, second position, wherein the pivoting member body trip assembly member interface 236 does not actuate the trip assembly member 30. As described below, the pivoting member body 230 is in the first position when the racking assembly carriage 52 is in "transition." Further, the pivoting member body 230 is in the second position when the racking assembly carriage 52 is in a "set" position. As such, the pivoting member body 230 can be described herein as being in a "transition" position or a "set" position which, as used herein, corresponds to the "first" and "second" positions, respectively, described in this paragraph.

In an exemplary embodiment, the pivoting member body pivot mounting 238 is disposed on the "bight" of the pivoting member body 230 and, in this configuration, the pivoting member body 230 "rocks" between the first position and second position. Further, in this embodiment, the pivoting member spring 214 is a compression spring disposed on one side of the pivoting member body pivot mounting axle 239 so that the pivoting member body 230 is biased to the first position. The pivoting member spring 214 is, in an exemplary embodiment, the strongest spring in the interlock system 100 and has a bias sufficient to overcome the bias of the second closing spring 212.

The pivoting member body 230 is biased to the first position by the pivoting member spring 214 but movement of the access door latch member 202 and the pivoting member 206 is affected by, i.e., controlled by, the first latch assembly camming surfaces 208. In an exemplary embodiment, the first latch assembly camming surfaces 208 are defined by a number of recesses 240 (two shown) in the racking assembly position indicator 58. As noted above, the racking assembly position indicator 58 moves along with the racking; assembly carriage 52. The recesses 240 in the racking assembly position indicator 58 include downwardly offset surfaces 241, angled surfaces 242 (which are the first latch assembly camming surfaces 208) and "peaks" 244 which are, in an exemplary embodiment, generally planar. The first latch assembly camming surfaces 208 are structured to move along a camming path that engages the pivoting member body cam 234. Stated alternately, the pivoting member body cam 234 is disposed adjacent the racking assembly position indicator 58 and moves along the surface thereof. In an exemplary embodiment, there is a first position camming surface 208A, a test position, ramming surface 208B (which, as the middle camming surface, has two sides, one surface for motion in each direction), and a second position camming surface 208C.

Figure 2:
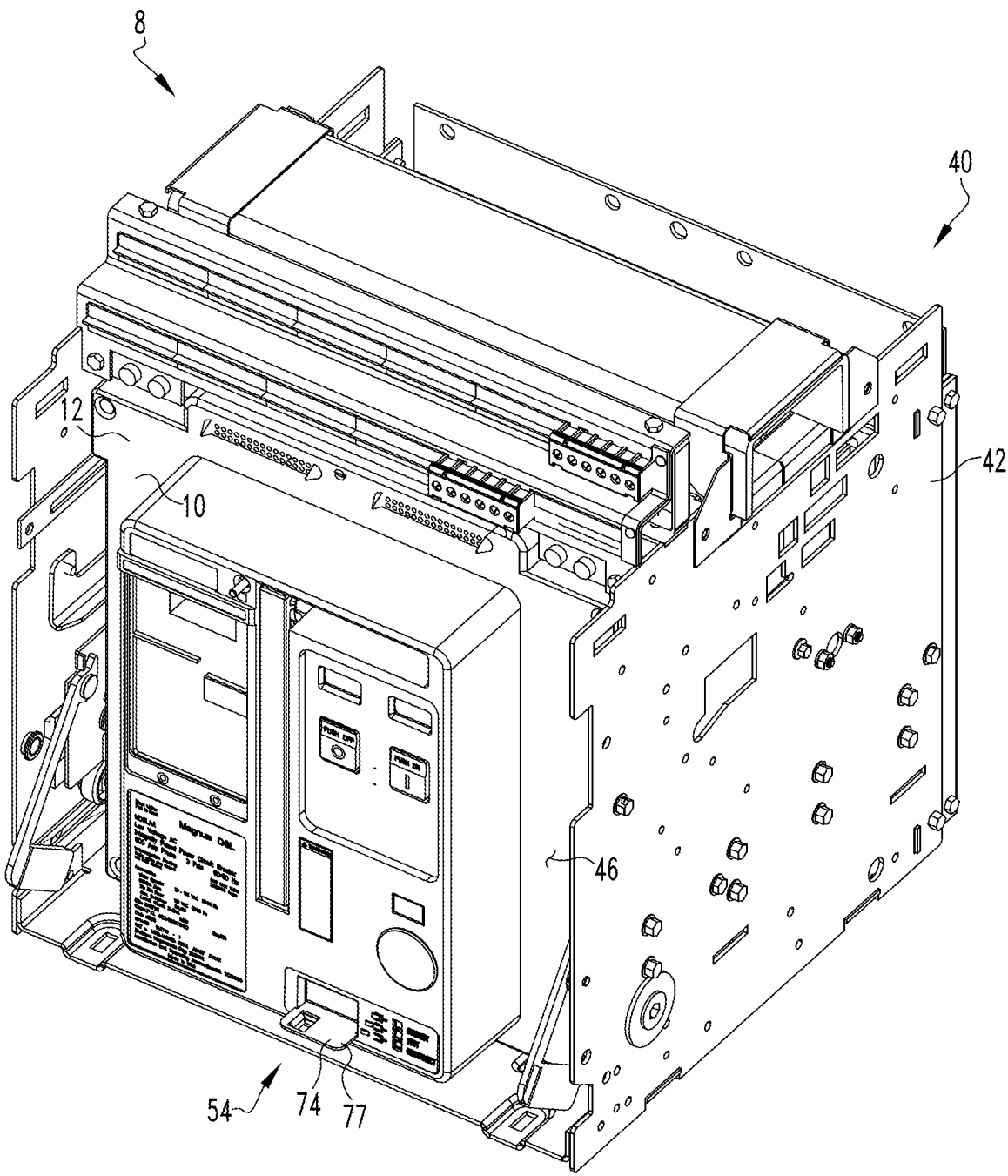
FIG. 2 is a schematic front view of an interlock system with the circuit breaker in a second position.
Figure 2A:
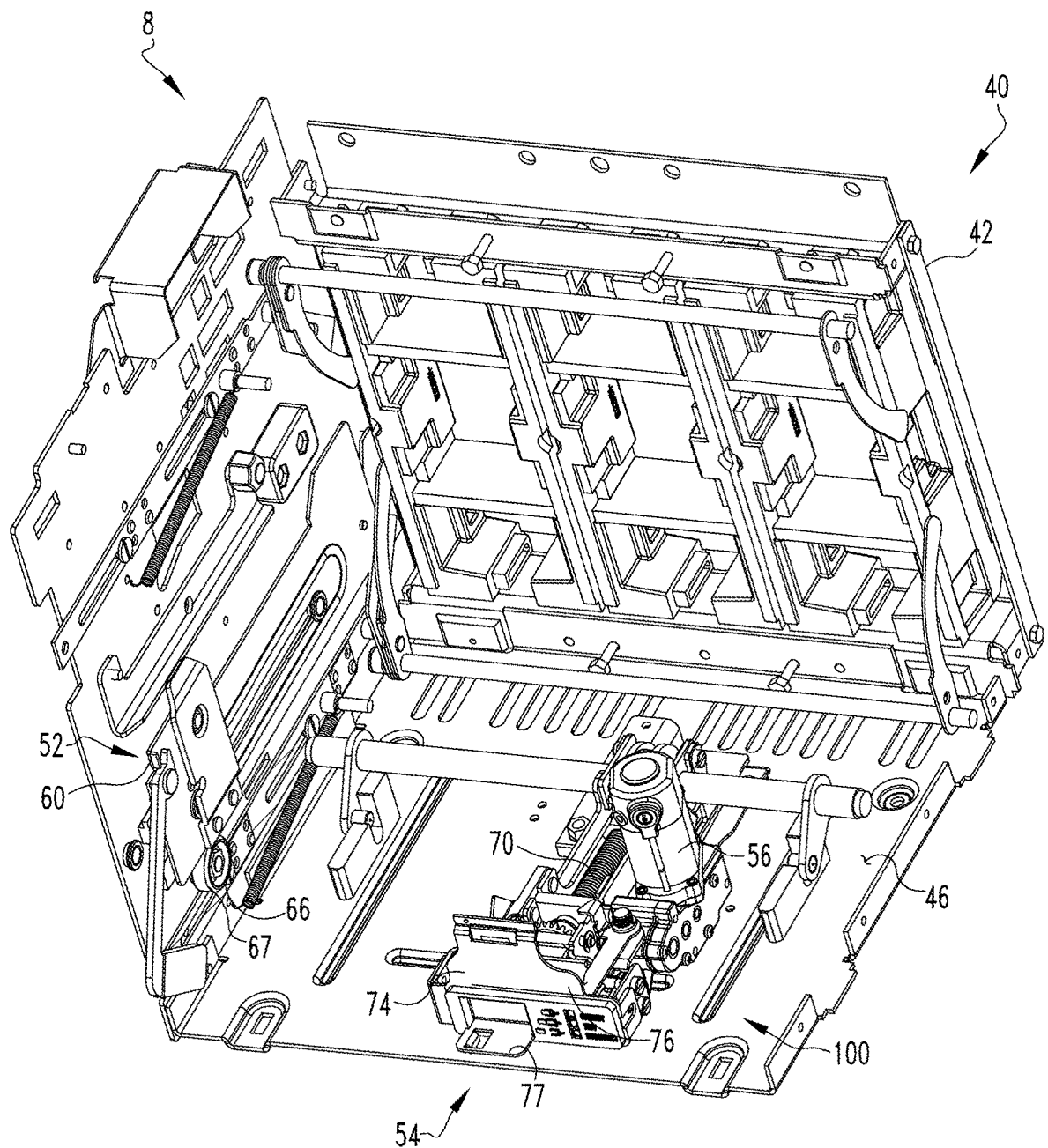
FIG. 2A is a schematic isometric view of a circuit breaker system similar to FIG. 1 with the circuit breaker and a portion of the enclosure removed for clarity.

Generally, when the pivoting member body cam 234 is disposed at a recess downwardly offset surface 241, the pivoting member body cam 234 is not engaged and the pivoting member body 230 is in, or is moved to, the access door open, first position. As used herein, and with respect to the pivoting member body cam 234 only, "at [X] surface" means disposed in a location where the pivoting member body cam 234 does contact and or engage the identified surface, or, where the pivoting member body cam 234 would contact and/or engage the identified surface if the pivoting member body cam 234 had a sufficient length extended, as shown in FIG. 2, substantially vertically downwardly. Thus, as shown in FIG. 2, when the pivoting member body cant 234 is disposed at a recess downwardly offset surface 241, the pivoting member body cam 234 is disposed in a recess 240 but does not have a sufficient length to contact the recess downwardly offset surface 241. It is understood in this configuration, no camming surface 208 engages the pivoting member body cam 234. Thus, given the configuration of the access door latch member 202 and the pivoting member 206 described above, the force acting on these elements is created by the pivoting member spring 214 which, as stated, biases the pivoting member 206 to its first position. Further, the recess downwardly offset surfaces 241 are positioned on the racking assembly position indicator 58 so that the pivoting member body cam 234 is disposed at a recess downwardly offset surface 241 when the circuit breaker assembly 10/racking assembly carriage 52 are in "transition."

The recess angled surfaces 242 are positioned on the racking assembly position indicator 58 so that the pivoting, member body cam 234 is disposed at a recess angled surface 242 when the circuit breaker assembly 10/racking assembly carriage 52 is substantially close to a "set" position. Thus, as the racking assembly position indicator 58 moves with the circuit breaker assembly 10/racking assembly carriage 52 toward a "set" position, the recess angled surfaces 242, i.e., the first latch assembly canning surfaces 208, engage the pivoting member body cam 234. This engagement overcomes the bias of the pivoting member spring 214 and allows the pivoting member 206 to move toward the second position.

The recess peaks 244 are positioned on the racking assembly position indicator 58 so that the pivoting, member body cam 234 is disposed at a recess peak 244 when the circuit breaker assembly 10/racking assembly carriage 52 is in a "set" position. As before, the engagement between the pivoting member body cam 234 and the recess peak 244 overcomes the bias of the pivoting member spring 214 and allows the pivoting member 206 to be maintained in its second position.

The pivoting, member spring 214 has a pivoting member spring force. In an exemplary embodiment, the first closing spring 210 has a first closing spring force and the second closing spring 212 has a second closing spring force. The combination of the first spring force and the second spring force is less than the pivoting member spring force. The first closing spring 210 is structured to, and does, engage the access door 74 to bias the access door 74 toward the access door 74 second position. The second closing spring 212 is structured to, and does, engage the trip assembly member 30 and bias the trip assembly member 30 toward the trip assembly member 30 second position.

In this configuration, and in view of the configuration of other elements of the interlock assembly 120 as described above, when the second latch, assembly latch member body latch 162 is disposed in the first position (wherein the access door 74 is not maintained in the access door second position) and when the circuit breaker assembly 10/racking assembly carriage 52 are in transition, the bias of the pivoting member spring 214 biases the pivoting member 206 to the first position. Further, if the access door 74 is in its first position, the access door latch member spring 204 maintains the access door latch member 202, and therefore the access door 74, in the first position. Then, when the circuit breaker assembly 10/racking assembly carriage 52 move into, and/or are in, a set position, the first latch assembly camming surfaces 208, engage the pivoting member body cam 234 thereby overcoming the bias of the pivoting member spring 214 and allows the pivoting member 206 to move toward the second position. As the pivoting member 206 moves toward the second position, the pivoting member body access door latch member interface 232 engages the access door latch member pivoting member interface 224 thereby moving the access door latch member 202 to its second position.

Thus, the bias of the first closing spring 210 engages the access door 74 and biases the access door 74 to the access door 74 second position. Further, the second closing spring 212 engages the trip assembly member 30 and biases the trip assembly member 30 to the trip assembly member 30 second position. Further, when the pivoting member 206 moves to the second position, the pivoting member body access door latch member interface 232 engages the access door latch member pivoting member interface 224 and moves and maintains the access door latch member 202 in the access door latch member 202 second position. That is, this interaction moves the access door latch member 202 so as to "release" the access door 74.

Thus, when using the manual racking assembly 54, the user initially moves the access door 74 to the first position. The first latch assembly 200 then maintains the access door 74 in the first position when the circuit breaker assembly 10/racking assembly carriage 52 are in transition. When the circuit breaker assembly 10/racking assembly carriage 52 move into a set position, and after the user removes the actuation tool from the socket 72, the first latch assembly 200 then moves the access door 74 to the second position. This, in turn, causes the second latch assembly member body 156 to move to its second position which, as described above, allows the user to move the separable contact assembly 19 to the closed, second configuration. That is, when the circuit breaker assembly 10 is in a set position, e.g., the "test position," the user is able to close the separable contact assembly 19. When the user again moves the access door 74 to the first position (and inserts the actuation tool in the socket 72) and moves circuit breaker assembly 10/racking assembly carriage 52 into transition, the first latch assembly 200 again maintains the access door 74 in the first position.

It is further noted that, when the access door is in the first position, either, or both, the access door position sensor 148 and/or the second latch assembly latch member position sensor 190 are not actuated and, as described above, when the sensors 148, 190 are not actuated, the motor 56 cannot be activated. Thus, when the manual racking assembly 54 is in use, the motor 56 cannot be used. Conversely, when the access door 74 is in the second position, i.e., when the manual racking assembly 54 is not in use, the sensors 148, 190 are actuated and the motor 56 can be activated. Thus, the interlock assembly 120 is structured to detect the configuration of the separable contact assembly 19 (via the second latch assembly 150) and the position of the access door 74 (via the first latch assembly 200 and/or the sensors 148, 190), and, to activate a motor control assembly 110 so as to enable the motor 56 only when the separable contact assembly 19 is in the first configuration and when the access door 74 is in the closed, second position.

In an exemplary embodiment, the interlock assembly 120 includes a mode selector assembly 250 that is structured to, and does, control the method of operation of the racking assembly 50. As noted above, the racking assembly 50 operates either manually or automatically. The mode selector assembly 250 is structured to, and does, limit the method of operation of the racking assembly 50 to one of an all enabled configuration, a manual enabled configuration, a motor enabled configuration, and an all, disabled configuration. As used herein, in the "all enabled" configuration, the racking assembly 50 operates either manually or automatically. As used herein, in the "manual enabled" configuration, the racking assembly 50 operates manually. As used herein, in the "motor enabled" configuration, the racking, assembly 50 operates automatically. As used herein, in the "all disabled" configuration, the racking assembly 50 does not operate either manually or automatically.

The mode selector assembly 250 includes an elongated member 252, an access door member 254, a biasing assembly 256, and a mode selector assembly position sensor 258. The mode selector assembly position sensor 258 is a sensor 112 as described above and includes an actuation switch 116, i.e., a "mode selector assembly position sensor actuation switch". The mode selector assembly position sensor 258 is structured to, and does, provide an activation, signal to the motor control assembly 110 when the mode selector assembly position sensor actuation switch 116 is actuated and to not provide an activation signal to the motor control assembly 110 when the mode selector assembly position sensor actuation switch 116 is not actuated.

The mode selector assembly access door member 254 is fixed to, including being unitary with, the access door 74 and moves therewith. In an exemplary embodiment, the mode selector assembly access door member 254 extends laterally from a vertical side of the access door 74. Thus, the mode selector assembly access door member 254 has a path of travel that corresponds to the motion of the access door 74.

The mode selector assembly member 252 includes an elongated body 260 with an access door member interface 262, a motor control assembly actuator interface 264, and a bias assembly interface 266. In an exemplary embodiment, each interface 262, 264, 266 identified in the prior sentence is a protrusion from the mode selector assembly member body 260. The access door member interface 262 and the motor control assembly actuator interface 264 are spaced from each other in a manner so that these interfaces 262, 264 are structured to be placed in the different positions set forth below. This spacing is also dependent upon the positions of the mode selector assembly position sensor 258 and the mode selector assembly access door member 254. One example of such spacing is shown in the Figures. Further, in an exemplary embodiment, the motor control assembly actuator interface 264 includes angled cam surfaces 268. As discussed with other sensors 112, the motor control assembly actuator interface angled cam surfaces 268 move, e.g., slide, over the mode selector assembly position sensor actuation switch 116 as the mode selector assembly member body 260 moves. That is, the mode selector assembly member body 260 is structured to, and does, move between a number of positions. In an exemplary embodiment, the mode selector assembly member body 260 is structured to, and does, move between any of an all enabled position, a manual enabled position, a motor enabled position, and an all disabled position.

When the mode selector assembly member body 260 is in the all, enabled position, the mode selector assembly member body access door member interface 262 is not disposed in the path of the mode selector assembly access door member 254 and the access door 74 is free to move between the access door 74 first and second positions, and, the mode selector assembly member body motor control assembly actuator interface 264 actuates the mode selector assembly position sensor actuation switch 116. Thus, when the mode selector assembly member body 260 is in this position, the mode selector assembly position sensor 258 provides an activation signal to the motor control assembly 110, as described above. Stated alternately, when the mode selector assembly member body 260 is in this position, the user is able to utilize either the manual racking assembly 54 or the racking assembly motor 56. This is the "all enabled" configuration of the mode selector assembly 250.

When the mode selector assembly member body 260 is in the manual enabled position, the mode selector assembly member body, access door member interface 262 is not disposed in the path of the mode selector assembly access door member 254 and the access door 74 is free to move between the access door 74 first and second positions, and, the mode selector assembly member body motor control assembly actuator interface 264 does not actuate the mode selector assembly position sensor actuation switch 116. Thus, when the mode selector assembly member body 260 is in this position, the mode selector assembly position sensor 258 does not provide an activation signal to the motor control assembly 110, as described above. Stated alternately, when the mode selector assembly member body 260 is in this position, the user is able to utilize only the manual racking assembly 54. This is the "manual enabled" configuration of the mode selector assembly 250.

When the mode selector assembly member body 260 is in the motor enabled position, the mode selector assembly member body access door member interface 262 is disposed in the path of the mode selector assembly access door member 254 and the access door 74 cannot move from the access door second position. Thus, as the access door 74 cannot move to the first position, the actuation tool cannot be coupled to the manual racking assembly rod socket 72 and the manual racking assembly 54 cannot be used. Further, the mode selector assembly member body motor control assembly actuator interface 264 actuates the mode selector assembly position sensor actuation switch 116. Thus, when the mode selector assembly member body 260 is in this position, the mode selector assembly position sensor 258 provides an activation signal to, the motor control assembly 110, as described above. This is the "motor enabled" configuration of the mode selector assembly 250.

When the mode selector assembly member body 260 is in the all disabled position, the mode selector assembly member body access door member interface 262 is disposed in the path of the mode selector assembly access door member 254 and the access door 74 cannot move from the access door 74 second position, and, the mode selector assembly member body motor control assembly actuator interface 264 does not actuate the mode selector assembly position sensor actuation switch 116. Thus, when the mode selector assembly member body 260 is in this position, the mode selector assembly position sensor 258 does not provide an activation signal to the motor control assembly 110, as described above. This is the "all disabled" configuration of the mode selector assembly 250.

In an exemplary embodiment, the mode selector assembly biasing assembly 256 includes two springs 270, 272 that are structured to, and do, apply bias in opposed directions. The mode selector assembly member bias assembly interface 266 is, in an exemplary embodiment, a generally radial/perpendicular extension from the mode selector assembly member body 260. The mode selector assembly member bias assembly interface 266 is disposed between the mode selector assembly biasing assembly springs 270, 272. In this configuration, the mode selector assembly biasing assembly 256 is structured to, and does, engage the mode selector assembly member body bias assembly interface 266 and biases the mode selector assembly member body 260 to a selected position, in an exemplary embodiment, the mode selector assembly member body 260 is biased to the all enabled position.

Further, in an exemplary embodiment, the mode selector assembly member body 260 includes a number of openings 280 and the circuit breaker assembly housing assembly 12 includes a number of mode selector openings 282, it is understood that, in an exemplary embodiment, only one of the mode selector assembly member body 260 or the circuit breaker assembly housing assembly 12 includes a plurality of openings and the other includes a single opening. As shown in FIG. 3, the mode selector assembly member body 260 is shown as having a single opening 280 and the circuit breaker assembly housing assembly 12 is shown as having a plurality of openings 282. When the mode selector assembly member body opening 280 is aligned with an enclosure opening 282, a pin, hasp or similar construct is passed through both openings 280, 282 and maintains the mode selector assembly member body 260 in a position relative to the circuit breaker assembly housing assembly 12.

In an exemplary embodiment, the locations of the enclosure opening 282 are spaced so that when a pin is passed through both a mode selector assembly member body opening 280 and the hasp opening (not shown), the mode selector assembly member body 260 is disposed in a selected position such as, in an exemplary embodiment, one of the all enabled position, the manual enabled position, the motor enabled position, and the all disabled position.

An interlock system 100 in this configuration solves die problems stated above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An interlock system for a circuit breaker system, said circuit breaker system including an enclosure, a racking assembly, and a circuit breaker assembly, said enclosure defining an enclosed space, said racking assembly including a carriage, a manual racking assembly, a motor, and a position indicator, said racking assembly carriage structured to move between a number of set positions including a disconnect, first position and a connect, second position, wherein, if said racking assembly carriage is not in an identified set position, said racking assembly carriage is in transition, said manual racking assembly is structured to move said racking assembly carriage between said racking assembly carriage set positions, said manual racking assembly including a rotating rod with a socket, said motor structured to move said racking assembly carriage between said racking assembly carriage set positions, said racking assembly position indicator including an indicator member body, said indicator member body structured to move with said racking assembly carriage, said circuit breaker assembly including a separable contact assembly, said separable contact assembly including a number of fixed contacts and a number of movable contacts, the movable contacts movable between a first configuration, wherein the movable contacts are spaced from, and are not in electrical communication with, the fixed contacts, and, a second configuration, wherein the movable contacts are coupled to, and are in electrical communication with, the fixed contacts, said circuit breaker assembly further including an operating mechanism contact position indicator member and a manually actuatable trip assembly member, said circuit breaker assembly disposed on said racking assembly carriage, said interlock system comprising:
a movable access door structured to move between an open, first position wherein said access door does not block access to said manual racking assembly socket, and, a closed, second position wherein said access door blocks access to said manual racking assembly socket; and
an interlock assembly structured to allow manual use of said racking assembly when said access door is in said first position, to allow use of said motor when said access door is in said second position, and to maintain said movable contacts in said first configuration when said racking assembly carriage is in transition.

2. The interlock system of claim 1 wherein:
said interlock assembly is structured to detect the configuration of said separable contact assembly and the position of said access door, and, which includes a first latch assembly structured to maintain said access door in said first position when said racking assembly carriage is in transition and structured to release said access door to be moved to said second position when said racking assembly carriage is in a set position.

3. The interlock system of claim 2 wherein:
said first latch assembly includes an access door latch member;
said access door latch member including a body with an access door interface and a pivoting member interface; and
said access door latch member structured to move between a first position, wherein said access door latch member engages said access door and maintains said access door in said access door first position, and, a second position, wherein said access door latch member releases said access door thereby allowing said access door to move to said access door second position.

4. The interlock system of claim 3 wherein:
said first latch assembly includes a pivoting member;
said pivoting member including a body;
said pivoting member body including an access door latch member interface, a cam, and a trip assembly member interface;
said pivoting member body structured to pivot between an access door open, first position, wherein said pivoting member body trip assembly member interface actuates said trip assembly member, and an access door closed, second position, wherein said pivoting member body trip assembly member interface does not actuate said trip assembly member;
wherein, when said pivoting member body is in said pivoting member body first position, said pivoting member body access door latch member interface does not engage said access door latch member pivoting member interface whereby said access door latch member is biased to said first position; and
wherein, when said pivoting member body is in said pivoting member body second position, said pivoting member body access door latch member interface engages said access door latch member body pivoting member interface and maintains said access door latch member in said access door latch member second position.

5. The interlock system of claim 4 wherein:
said first latch assembly includes a number of camming surfaces that are defined by a number of recesses in said racking assembly position indicator;
said first latch assembly number of camming surfaces structured to move along a camming path that engages said pivoting member body cam;
wherein, when a first latch assembly number of camming surface fully engages said pivoting member body cam, said pivoting member body is moved to the pivoting member body second position;
wherein said first latch assembly number of camming surfaces includes a first position camming surface and a second position camming surface;

said first camming surface is structured to fully engage said pivoting member body cam when said racking assembly carriage is in said racking assembly carriage first position; and said second camming surface is structured to fully engage said pivoting member body cam when said racking assembly carriage is in said racking assembly carriage second position.

6. The interlock system of claim 2 wherein:

said access door includes a trip assembly member interface;

said access door trip assembly member interface is structured to actuate said trip assembly member when said access door is in said first position; and said access door trip assembly member interface is structured to not actuate said trip assembly member when said access door is in said second position.

7. The interlock system of claim 2 further comprising:

an actuatable motor control assembly structured to enable/disable said racking assembly motor; and said interlock assembly structured to activate said motor control assembly so as to enable said motor only when said separable contact assembly is in said first configuration and when said access door is in said closed, second position.

8. The interlock system of claim 7 wherein:

said access door includes a motor control assembly actuator interface;

said access door motor control assembly actuator interface is structured to activate said motor control assembly when said access door is in said second position; and said access door motor control assembly actuator interface is not structured to activate said motor control assembly when said access door is in said first position.

9. The interlock system of claim 8 wherein:

said interlock assembly includes an access door position sensor;

said access door position sensor including an actuation switch;

said access door position sensor structured to provide an activation signal to the motor control assembly when said access door position sensor actuation switch is actuated and not to provide an activation signal to the motor control assembly when said access door position sensor actuation switch is not actuated; and said access door position sensor positioned so that, when said access door is in said first position, said access door motor control assembly actuator interface does not actuate said access door position sensor actuation switch, and, when said access door is in said second position, said access door motor control assembly actuator interface actuates said access door position sensor actuation switch.

10. The interlock system of claim 7 wherein:

said interlock assembly includes a mode selector assembly;

said mode selector assembly includes a member, an access door member and a mode selector assembly position sensor;

said mode selector assembly position sensor including an actuation switch;

said mode selector assembly position sensor structured to provide an activation signal to the motor control assembly when said mode selector assembly position sensor actuation switch is actuated and to not provide an activation signal to the motor control assembly when said mode selector assembly position sensor actuation switch is not actuated;

said mode selector assembly access door member is fixed to said access door;

said mode selector assembly member including a body with an access door member interface and a motor control assembly actuator interface; and said mode selector assembly member body structured to move between a number of positions.

11. The interlock system of claim 7 wherein:

said interlock assembly includes a second latch assembly;

said access door includes a second latch assembly catch;

said second latch assembly includes a latch member;

said second latch assembly latch member including a body with a motor control assembly actuator interface and a latch;

said access door second latch assembly catch structured to be engaged by said second latch assembly latch member body latch only when said access door is in said second position;

said second latch assembly latch member body structured to move between a first position, wherein said second latch assembly latch member body latch does not engage said second latch assembly catch, and a second position, wherein said second latch assembly latch member body latch engages said second latch assembly catch;

said interlock assembly includes a second latch assembly latch member position sensor;

said second latch assembly latch member position sensor including an actuation switch;

said second latch assembly latch member position sensor structured to provide an activation signal to the motor control assembly when said second latch assembly latch member position sensor actuation switch is actuated and does not provide an activation signal to the motor control assembly when said second latch assembly latch member position sensor actuation switch is not actuated; and said second latch assembly latch member position sensor positioned so that, when said second latch assembly latch member is in said first position, said second latch assembly latch member body motor control assembly actuator interface does not actuate said second latch assembly latch member position sensor actuation switch, and, when said second latch assembly latch member is in said second position, said second latch assembly latch member body motor control assembly actuator interface actuates said second latch assembly latch member position sensor actuation switch.

12. A circuit breaker system comprising:

an enclosure defining an enclosed space;

a racking assembly including a carriage, a manual racking assembly, a motor, and a position indicator;

a circuit breaker assembly;

said racking assembly carriage structured to move between a number of set positions including a disconnect, first position and a connect, second position, wherein, if said racking assembly carriage is not in an identified set position, said racking assembly carriage is in transition;

said manual racking assembly structured to move said racking assembly carriage between said racking assembly carriage set positions, said manual racking assembly including a rotating rod with a socket;

said motor structured to move said racking assembly carriage between said racking assembly carriage set positions;
said racking assembly position indicator including an indicator member body;
said indicator member body structured to move with said racking assembly carriage;
said circuit breaker assembly including a separable contact assembly;
said separable contact assembly including a number of fixed contacts and a number of movable contacts, the movable contacts movable between a first configuration, wherein the movable contacts are spaced from, and are not in electrical communication with, the fixed contacts, and, a second configuration, wherein the movable contacts are coupled to, and are in electrical communication with, the fixed contacts;
said circuit breaker assembly further including an operating mechanism contact position indicator member and a manually actuatable trip assembly member;
said circuit breaker assembly disposed on said racking assembly carriage;
an interlock system including a movable access door and an interlock assembly;
wherein said movable access door is structured to move between an open, first position wherein said access door does not block access to said manual racking assembly socket, and, a closed, second position wherein said access door blocks access to said manual racking assembly socket; and
said interlock assembly structured to allow manual use of said racking assembly when said access door is in said first position, to allow use of said motor when said access door is in said second position, and to maintain said movable contacts in said first configuration when said racking assembly carriage is in transition.

13. The circuit breaker system of claim 12 wherein said interlock assembly structured to detect the configuration of said separable contact assembly and the position of said access door, and, which includes a first latch assembly structured to maintain said access door in said first position when said racking assembly carriage is in transition and structured to release said access door to be moved to said second position when said racking assembly carriage is in a set position.

14. The circuit breaker system of claim 13 wherein:
said first latch assembly includes an access door latch member;
said access door latch member including a body with an access door interface and a pivoting member interface; and
said access door latch member structured to move between a first position, wherein said access door latch member engages said access door and maintains said access door in said access door first position, and, a second position, wherein said access door latch member releases said access door thereby allowing said access door to move to said access door second position.

15. The circuit breaker system of claim 14 wherein:
said first latch assembly includes a pivoting member;
said pivoting member including a body;
said pivoting member body including an access door latch member interface, a cam, and a trip assembly member interface;
said pivoting member body structured to pivot between an access door open, first position, wherein said pivoting member body trip assembly member interface actuates said trip assembly member, and an access door closed, second position, wherein said pivoting member body trip assembly member interface does not actuate said trip assembly member;
wherein, when said pivoting member body is in said pivoting member body first position, said pivoting member body access door latch member interface does not engage said access door latch member body pivoting member interface whereby said access door latch member is biased to said first position; and
wherein, when said pivoting member body is in said pivoting member body second position, said pivoting member body access door latch member interface engages said access door latch member body pivoting member interface and maintains said access door latch member in said access door latch member second position.

16. The circuit breaker system of claim 15 wherein:
said first latch assembly includes a number of camming surfaces that are defined by a number of recesses in said racking assembly position indicator;
said first latch assembly number of camming surfaces structured to move along a camming path that engages said pivoting member body cam;
wherein, when a first latch assembly number of camming surface fully engages said pivoting member body cam, said pivoting member body is moved to the pivoting member body second position;
wherein said first latch assembly number of camming surfaces includes a first position camming surface and a second position camming surface;
said first position camming surface is structured to fully engage said pivoting member body cam when said racking assembly carriage is in said racking assembly carriage first position; and
said second position camming surface is structured to fully engage said pivoting member body cam when said racking assembly carriage is in said racking assembly carriage second position.

17. The circuit breaker system of claim 13 wherein:
said access door includes a trip assembly member interface;
said access door trip assembly member interface is structured to actuate said trip assembly member when said access door is in said first position; and
said access door trip assembly member interface is structured to not actuate said trip assembly member when said access door is in said second position.

18. The circuit breaker system of claim 13 wherein:
said interlock system includes an actuatable motor control assembly structured to enable/disable said racking assembly motor; and
said interlock assembly structured to activate said motor control assembly so as to enable said motor only when said separable contact assembly is in said first configuration and when said access door is in said closed, second position.

19. The circuit breaker system of claim 18 wherein:
said access door includes a motor control assembly actuator interface;
said access door motor control assembly actuator interface is structured to activate said motor control assembly when said access door is in said second position; and said access door motor control assembly actuator interface is not structured to activate said motor control assembly when said access door is in said first position.

20. The circuit breaker system of claim 19 wherein:
said interlock assembly includes an access door position sensor;
said access door position sensor including an actuation switch;
said access door position sensor structured to provide an activation signal to the motor control assembly when said access door position sensor actuation switch is actuated and not to provide an activation signal to the motor control assembly when said access door position sensor actuation switch is not actuated;
said access door position sensor positioned so that, when said access door is in said first position, said access door motor control assembly actuator interface does not actuate said access door position sensor actuation switch, and, when said access door is in said second position, said access door motor control assembly actuator interface actuates said access door position sensor actuation switch.

21. The circuit breaker system of claim 18 wherein:
said interlock assembly includes a mode selector assembly;
said mode selector assembly includes a member, an access door member and a mode selector assembly position sensor;
said mode selector assembly position sensor including an actuation switch;
said mode selector assembly position sensor structured to provide an activation signal to the motor control assembly when said mode selector assembly position sensor actuation switch is actuated and to not provide an activation signal to the motor control assembly when said mode selector assembly position sensor actuation switch is not actuated;
said mode selector assembly access door member is fixed to said access door;
said mode selector assembly member including a body with an access door member interface and a motor control assembly actuator interface; and
said mode selector assembly member body structured to move between a number of positions.

22. The circuit breaker system of claim 18 wherein:
said interlock assembly includes a second latch assembly;
said access door includes a second latch assembly catch;
said second latch assembly includes a latch member;
said second latch assembly latch member including a body with a motor control assembly actuator interface and a latch;
said access door second latch assembly catch structured to be engaged by said second latch assembly latch member body latch only when said access door is in said second position;
said second latch assembly latch member body structured to move between a first position, wherein said second latch assembly latch member body latch does not engage said second latch assembly catch, and a second position, wherein said second latch assembly latch member body latch engages said second latch assembly catch;
said interlock assembly includes a second latch assembly latch member position sensor;
said second latch assembly latch member position sensor including an actuation switch;
said second latch assembly latch member position sensor structured to provide an activation signal to the motor control assembly when said second latch assembly latch member position sensor actuation switch is actuated and does not provide an activation signal to the motor control assembly when said second latch assembly latch member position sensor actuation switch is not actuated; and
said second latch assembly latch member position sensor positioned so that, when said second latch assembly latch member is in said first position, said second latch assembly latch member body motor control assembly actuator interface does not actuate said second latch assembly latch member position sensor actuation switch, and, when said second latch assembly latch member is in said second position, said second latch assembly latch member body motor control assembly actuator interface actuates said second latch assembly latch member position sensor actuation switch.

* * * * *